(12) United States Patent
Graham

(10) Patent No.: US 7,516,322 B1
(45) Date of Patent: Apr. 7, 2009

(54) COPY PROTECTION BUILT INTO A NETWORK INFRASTRUCTURE

(75) Inventor: Philip R. Graham, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 09/733,537

(22) Filed: Dec. 7, 2000

(51) Int. Cl.
*H04L 9/00* (2006.01)
*G06F 17/00* (2006.01)

(52) U.S. Cl. ......................................... 713/160; 726/13
(58) Field of Classification Search ................. 380/203; 713/176
See application file for complete search history.

(56) References Cited

U.S. PATENT DOCUMENTS

| | | | |
|---|---|---|---|
| 5,835,726 A * | 11/1998 | Shwed et al. | 709/229 |
| 6,085,321 A * | 7/2000 | Gibbs et al. | 713/170 |
| 6,212,636 B1 * | 4/2001 | Boyle et al. | 713/168 |
| 6,389,532 B1 * | 5/2002 | Gupta et al. | 713/163 |
| 6,606,450 B1 * | 8/2003 | Klebanoy et al. | 386/94 |
| 6,680,906 B1 * | 1/2004 | Nguyen | 370/229 |
| 6,691,165 B1 * | 2/2004 | Bruck et al. | 709/227 |
| 6,732,180 B1 * | 5/2004 | Hale et al. | 709/229 |
| 2002/0167943 A1 * | 11/2002 | Hakim et al. | 370/356 |

* cited by examiner

*Primary Examiner*—Brandon S Hoffman
(74) *Attorney, Agent, or Firm*—Stolowitz Ford Cowger LLP

(57) ABSTRACT

A method for a network infrastructure copy protection system. The method includes the step of applying a digital signature to a digital content file prior to transmission. Digital content files that are to be legitimately transmitted across the distributed computer network are modified by the application of digital signatures corresponding to the sender. As content files are transmitted across a distributed computer network, the distributed computer network examines the content files to determine whether they include the digital signatures. The examining is performed by hardware comprising the infrastructure of the distributed computer network. When content files include respective digital signatures, the content files are transmitted by the infrastructure. When the content files do not include the digital signatures, transmission of those content files not having digital signatures is blocked. The digital signatures are configured to identify the senders of the digital content files. The digital signatures can be logged within the distributed computer network to maintain a record of the digital content files as they are transmitted. The hardware performing the examining can be a plurality of routers or a plurality of cache engines within the distributed computer network.

22 Claims, 6 Drawing Sheets

COPY PROTECTION BUILT INTO A NETWORK INFRASTRUCTURE

TECHNICAL FIELD

The present invention relates generally to methods and systems implementing copy protection for digital content. More specifically, the present invention pertains to a method and system for implementing copy protection directly into the network infrastructure.

BACKGROUND ART

The current state of media and entertainment is rapidly moving to digital forms of storage and distribution. Such digital forms include, for example, optical disk media (CDs, DVDs, minidisk, Video CD, etc.), digital video (e.g., streaming video, digital CATV, satellite TV). As media and entertainment content assume digital forms, it becomes much easier for individuals to abuse the copyrights of the content. These typically start off as some form of purchased entertainment such as a CD, DVD, Video-tape, digital book etc.

The digital nature of the content lends itself to easy duplication and sharing. The means for creating digital copies is readily available. For example, users can process digital content using desktop computer systems with easily obtained software (e.g., widely available on the Internet), convert content to alternative digital formats that may have reduced the value of the content (lower quality), or just make it easier to transfer the content to another person which may infringe on the original copyright holders rights. The widespread emergence of broadband internet connections greatly facilitates the abuse (e.g., unauthorized file sharing, etc.) of copyrighted content by consumers. As broadband Internet connections proliferate, it becomes much easier to obtain unauthorized digital copies of music, video, books, and the like.

Hence, protection of copyrighted content has become a primary concern. Generally, most prior art solutions to the copy protection problem involve encryption at the edge devices. Edge devices refers to the devices used to encrypt the content at the origination (e.g., at the content creator's premises) and the devices used to decrypt the content at the destination (e.g., at the consumer's home). The content remains encrypted during transmission. Examples include the encryption protecting DVDs, the encryption protecting pay-per-view video programs, and the like.

The problem with these types of edge encryption solutions is that generally it is easy to break the security and remove it from the work being protected. This is especially so with those media types available for playback on desktop computer systems. With the increasingly powerful processors and software available for desktop computer systems, only the most powerful encryption schemes remain secure (e.g., not compromised by "hackers") over time.

Another problem is the fact that enterprises and service providers need to protect their networks from traffic types that could disrupt service. In order to ensure that their customers get the best service from their networks, enterprises and service providers have a strong interest in ensuring available network resources are not consumed by the unauthorized access and exchange of digital content media (e.g., unauthorized streaming media, MP3 files, etc.). The prior art provides practically no network management tools for the management of network traffic based on the actual data being transmitted/received. For example, while prior art "fire wall" systems are widely used to prevent unauthorized access to protected networks, the increasing importance of the World Wide Web to most businesses require the businesses to interface with the Web. One such widely used Web interface is HTTP web traffic port 80, which is used by both client side and server side applications to exchange data. Consequently, traditional prior art firewall systems have little effect in preventing the unauthorized traffic in the current network infrastructure.

Thus, what is required is a solution that can enhance copy protection for copyrighted digital content. The required solution should be robust enough to prevent easy circumvention while avoiding the imposition of latency inducing encryption on edge devices. The required solution should provide accountability for the dissemination of copyrighted digital content. The required solution should preserve network resources for use by authorized traffic. The present invention provides a novel solution to the above requirements.

DISCLOSURE OF THE INVENTION

The present invention provides a solution that enhances copy protection for copyrighted digital content. The present invention is robust enough to prevent easy circumvention while avoiding the imposition of latency inducing encryption on edge devices. The present invention provides accountability for the dissemination of copyrighted digital content. Additionally, the present invention preserves network resources for use by authorized traffic.

In one embodiment, the present invention is implemented as a digital signature method for a network infrastructure copy protection system. The method includes the step of applying a digital signature to a digital content file prior to transmission. Digital content files that are to be legitimately transmitted across a distributed computer network (e.g., the Internet) are modified by the application of digital signatures corresponding to the sender. As content files are transmitted across a distributed computer network, the distributed computer network examines the content files to determine whether they include the digital signatures. The examining is performed by hardware and software comprising the infrastructure of the distributed computer network. When content files include respective digital signatures, the content files are transmitted by the infrastructure. When the content files do not include the digital signatures, transmission of those content files not having digital signatures is blocked.

The digital signatures are configured to identify the senders of the digital content files. The digital signatures can be logged within the distributed computer network to maintain a record of the digital content files as they are transmitted. The hardware performing the examining can be a plurality of routers or a plurality of cache engines within the distributed computer network. In so doing, copy protection for copyrighted digital content is enhanced in a manner robust enough to prevent easy circumvention while avoiding the imposition of latency inducing encryption on edge devices. Additionally, logging of digital signatures provides accountability for the dissemination of copyrighted digital content.

In an alternative embodiment, the present invention is implemented as a restricted data format method for a network infrastructure copy protection system. In this embodiment, once digital content files are received by the network infrastructure for transmission, the content files are examined to determine whether they include a restricted data format (such as, for example, MP3, Video MPEG, etc.). The examining is performed by the hardware of the distributed computer network. The content files that contain restricted data formats are blocked by the network infrastructure. Those content files that do not include a restricted data format (e.g., company training videos, video teleconferences, etc.) are freely transmitted. Thus, network resources are preserved for use by authorized traffic.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
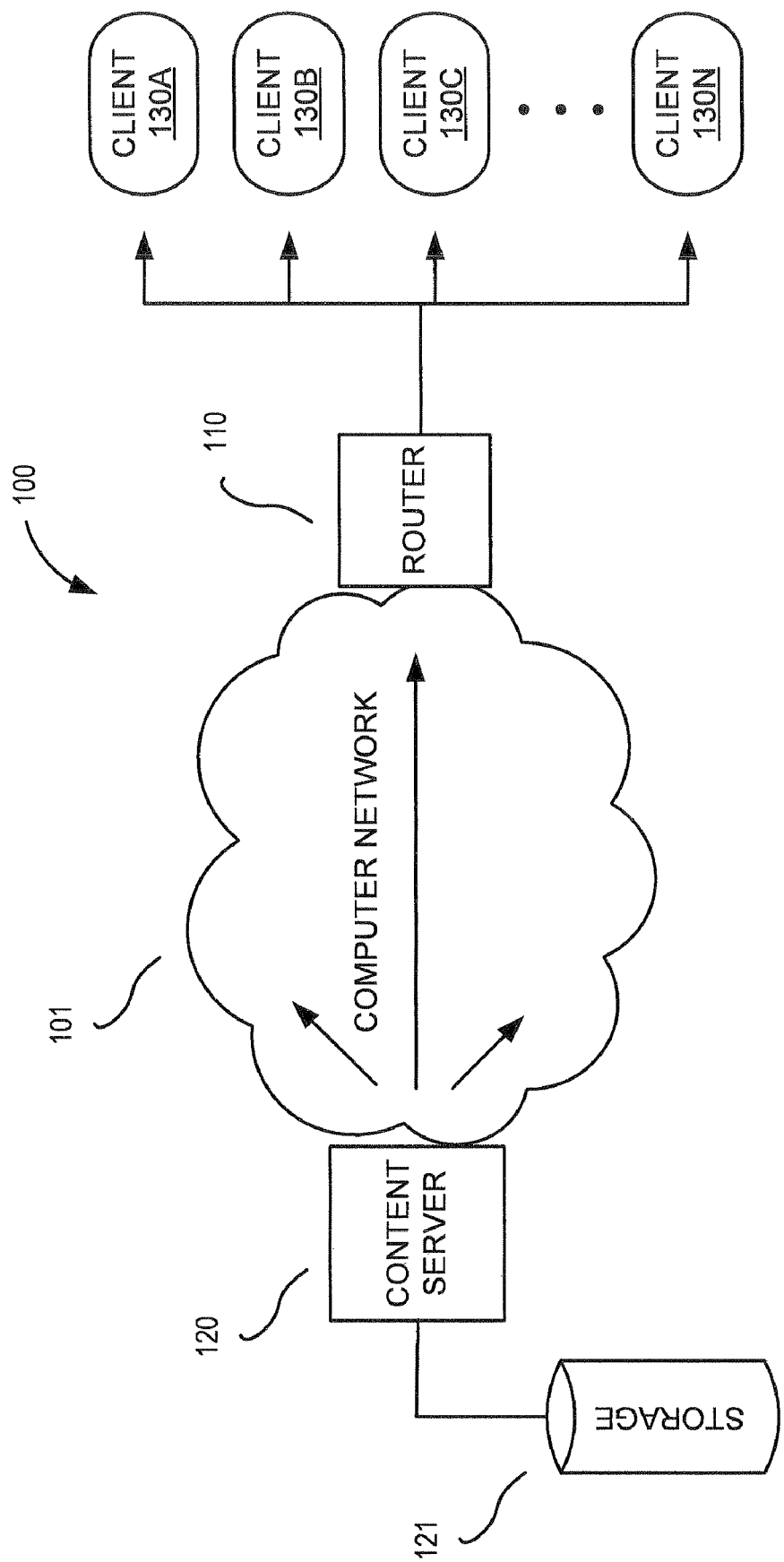
FIG. 1 shows a distributed computer network system in accordance with one embodiment of the present invention.

Reference will now be made in detail to the embodiments of the invention, copy protection built into a network infrastructure, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a solution that enhances copy protection for copyrighted digital content. The present invention is robust enough to prevent easy circumvention while avoiding the imposition of latency inducing encryption on edge devices. The present invention provides accountability for the dissemination of copyrighted digital content. Additionally, the present invention preserves network resources for use by authorized traffic. The present invention and its benefits are further described below.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "examining," "accessing," "routing," "determining," "transmitting," "Storing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices (e.g., computer system 612 of FIG. 6).

Copy Protection Method and System

Referring now to FIG. 1, a system 100 accordance with one embodiment of the present invention is shown. As depicted in FIG. 1, system 100 shows a distributed computer network 101 operable for implementing digital communications between a widely dispersed network of connected computer systems. Two such computer systems are shown, content server 120 and router 110. Content server 120 functions by distributing digital content to the widely dispersed network of computer systems via communications network 101. Digital content is stored on a connected storage unit 121 (e.g., a disk array) and is retrieved by content server 120 for transmission via computer network 101 in response to requests for the digital content. Router 110 functions by connecting clients 130a-n to computer network 101. For example, requests for digital content are transmitted by router 110 to the appropriate address of computer network 101 and the returning information is transmitted by router 110 to the appropriate one of clients 130a-n. Embodiments of the present invention are described in the context of communication between a content source and a content destination, in this case, content server 120 and router 110. Although content server 120 and router 110 are referred to as source and destination devices, it should be noted that any of clients 130a-n can also be source devices, as they can transmit digital content to other such clients connected to computer network 101.

In one embodiment, system 100 is used to implement a digital signature method for a network infrastructure copy protection. Digital signatures are used to modify digital content files prior to transmission via computer network 101. The method includes the step of applying or embedding a digital signature to a digital content file prior to transmission. The applying/embedding of the digital signature is performed by the originating device. Digital content files that are to be legitimately transmitted across the distributed computer network 101 are modified by the application of digital signatures corresponding to the sender. As content files are transmitted across a distributed computer network 101, the computer system hardware comprising distributed computer network 101 examines the content files to determine whether they include the digital signatures. In this embodiment, content server 120 and router 110 are part of computer network 101. Hence, the analysis and checking with regard to the digital signature can be performed by server 120 and router 110.

In accordance with present embodiment, the examining is performed by hardware comprising the infrastructure of the distributed computer network. One case is depicted in FIG. 1, with content server 120 and router 110 performing the examining. However, it should be noted that a vast number of different hardware elements comprise computer network 101 and a number of them can perform the examining as required by the present invention. For example, the hardware performing the examining can be a plurality of routers or a plurality of cache engines within the distributed computer network 101. When content files include respective digital signatures, the content files are transmitted by the infrastructure (e.g., server 120, router 110, etc.). When the content files do not include the digital signatures, transmission of those content files not having digital signatures is blocked.

The digital signatures are configured to identify the senders of the digital content files (e.g., one of clients 130a-n). The digital signatures can be logged within the distributed computer network 101 (e.g., logged by content server 120 or router 110) to maintain a record of the digital content files as they are transmitted. Copy protection is enforced by maintaining accountability for unauthorized copies. Unauthorized copies can be refused transmission across computer network 101 and the source of the authorized copy can be traced via the digital signature. In so doing, copy protection for copyrighted digital content is enhanced in a manner robust enough to prevent easy circumvention while avoiding the imposition of latency inducing encryption on edge devices. Additionally, logging of digital signatures provides accountability for the dissemination of copyrighted digital content.

In an alternative embodiment, the copy protection is provided through a restricted data format method. In this embodiment, once digital content files are received by the computer network 101 for transmission, the content files are examined to determine whether they include a restricted data format (such as, for example, MP3, Video MPEG, etc.). As with the digital signature embodiment described above, the examining is performed by the hardware (e.g., server 120, router 110, etc.) of the distributed computer network 101. The content files that contain restricted data formats are blocked by the computer network 101. Those content files that do not include a restricted data format (e.g., company training videos, video teleconferences, etc.) are freely transmitted. Thus, network resources are preserved for use by authorized traffic.

Figure 2:
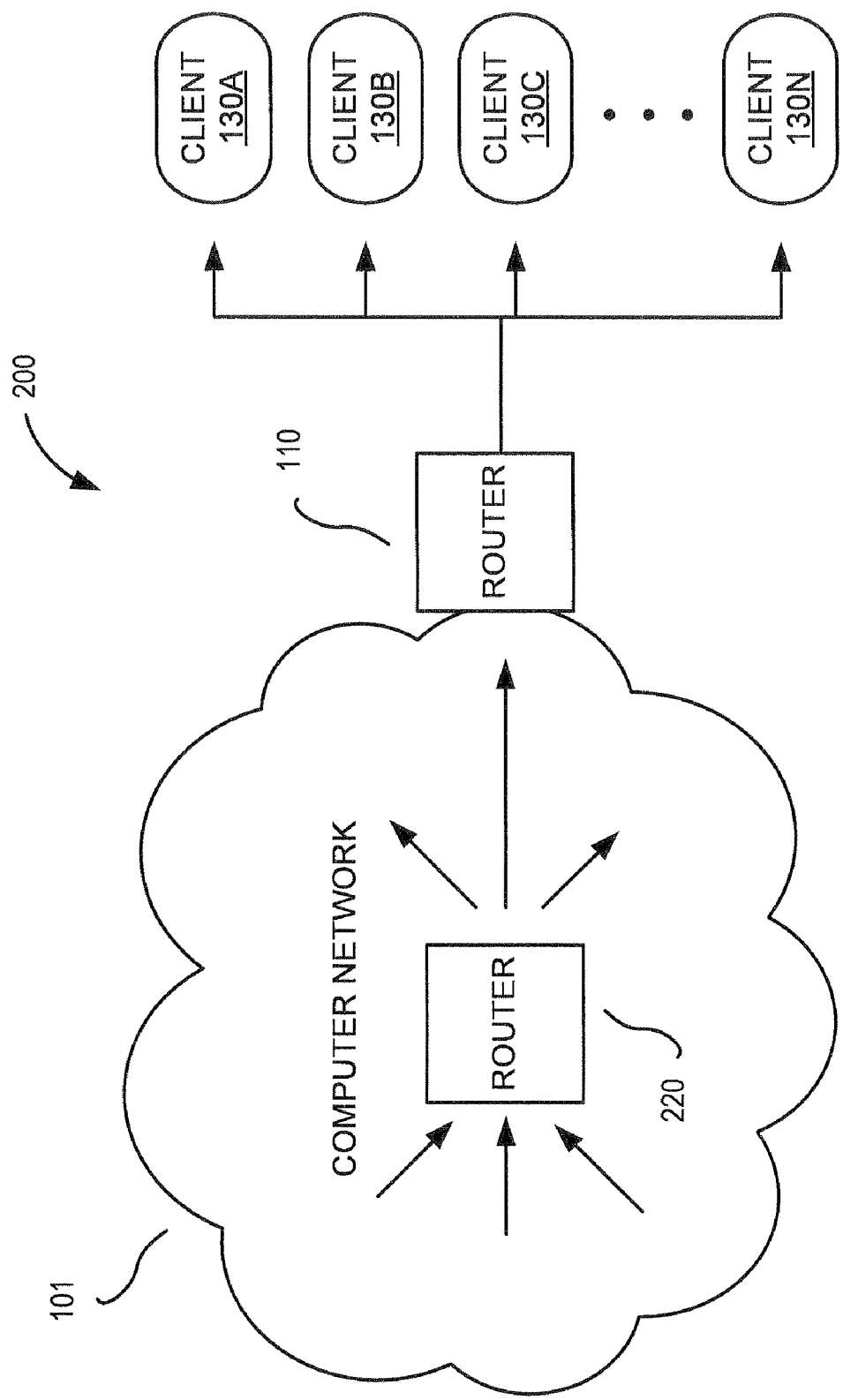
FIG. 2 shows a distributed computer network system in accordance with a second embodiment of the present invention.

Referring now to FIG. 2, a system 200 in accordance with one embodiment of the present invention is shown. System 200 is substantially similar to system 100 of FIG. 1, however as depicted in FIG. 2, system 200 explicitly shows a router 220 within the infrastructure to computer network 101 communicating with router 110 which is connected to users 130a-n. Router 220 functions by receiving requests for data from a number of connected computer systems and, in turn, distributing data to the number of connected computer systems, once such system being router 110. Thus, router 220 can be an intermediary node within computer network 101, for example, routing information from content server 120 (shown in FIG. 1) to router 110.

As described above, a vast number of different hardware elements comprise computer network 101 and a number of them can perform the examining as required by the present invention. FIG. 2 shows router 220 embedded within the computer network 101. In this embodiment, router 220 is configured to perform the examining required for implementing either the digital signature copy protection method or the restricted data format copy protection method of the present invention. As in system 100 of FIG. 1, the hardware performing the examining can be a plurality of routers or a plurality of cache engines within the distributed computer network 101.

Figure 3:
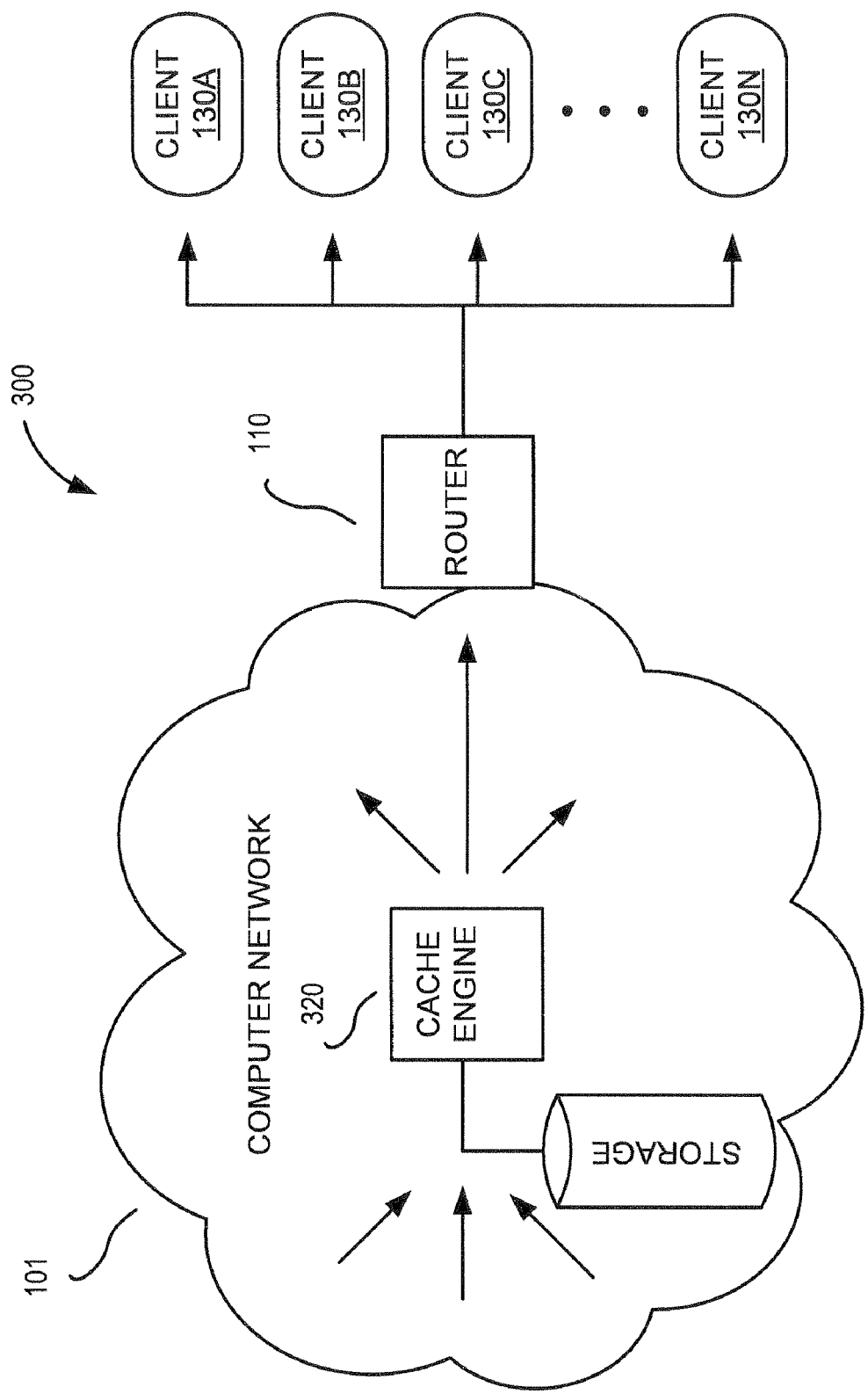
FIG. 3 shows a distributed computer network system in accordance with a third embodiment of the present invention.

FIG. 3 shows a system 300 in accordance with another embodiment of the present invention. System 300 is substantially similar to system 100 of FIG. 1, however as depicted in FIG. 3, system 300 explicitly shows a cache engine 320 within the infrastructure to computer network 101 communicating with router 110 which is connected to users 130a-n. Cache engine 320 functions by temporarily storing digital content as digital content is routed from sources to destinations coupled to computer network 101. Under certain conditions, such temporarily stored digital content can be accessed much faster than having to traverse computer network 101 to the actual content server acting as the source of the digital content. In this manner, cache engine 320 functions by speeding access to its temporarily stored digital content.

As described above, a vast number of different hardware elements comprise computer network 101 and a number of them can perform the examining as required by the present invention. FIG. 3 shows cache engine 320 embedded within the computer network 101. In this embodiment, cache engine 320 is configured to perform the examining required for implementing either the digital signature copy protection method or the restricted data format copy protection method of the present invention. As in system 100 FIG. 1, the hardware performing the examining can be a plurality of routers or a plurality of cache engines within the distributed computer network 101.

Figure 4:
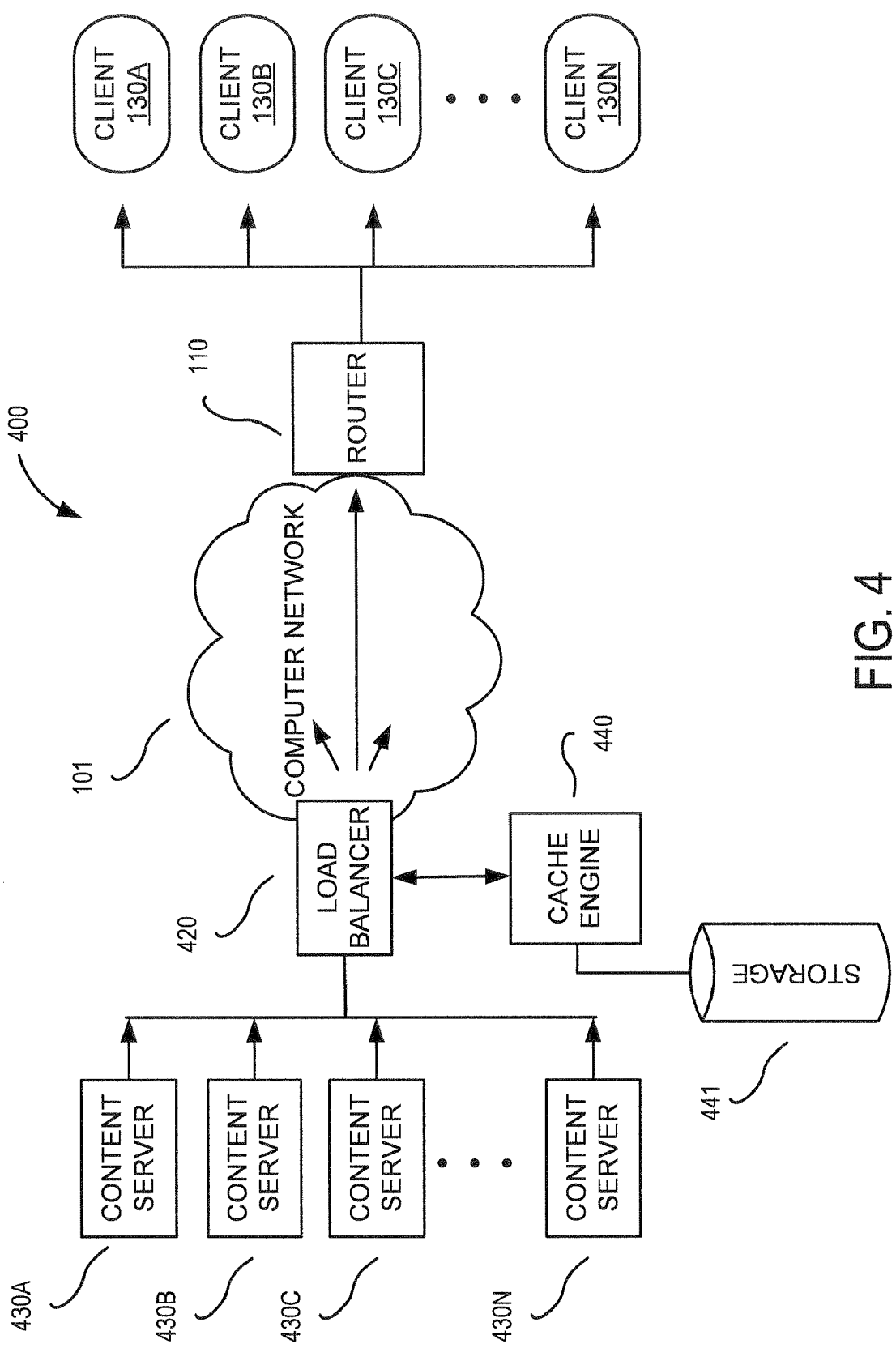
FIG. 4 shows a distributed computer network system in accordance with a fourth embodiment of the present invention.

FIG. 4 shows a system 400 in accordance with yet another embodiment of the present invention. System 400 is substantially similar to system 100 FIG. 1, however as depicted in FIG. 4, system 400 shows a number of content servers 430a-n coupled to computer network 101 via a load balancer 420, which in turn, communicates with router 110 via computer network 101. The load balancer 420 functions by distributing requests for digital content among the number of content servers 430a-n. Hence, the load for servicing the requests is spread evenly among the content servers 430a-n. As depicted in FIG. 4, load balancer 420 is coupled to a cache engine 440, which temporarily stores digital content on a storage unit 441. As with cache engine 320 of FIG. 3, cache engine 440 functions by speeding access to digital content maintained on content servers 430a-n.

As described above, a number of different hardware elements comprise computer network 101 and a number of them can perform the required examining. In this embodiment, the load balancer 420 is configured to perform the examining required for implementing either the digital signature copy protection method or the restricted data format copy protection method of the present invention. As in system 100 FIG. 1, the hardware performing the examining can be a plurality of routers or a plurality of cache engines within the distributed computer network 101.

Figure 5:
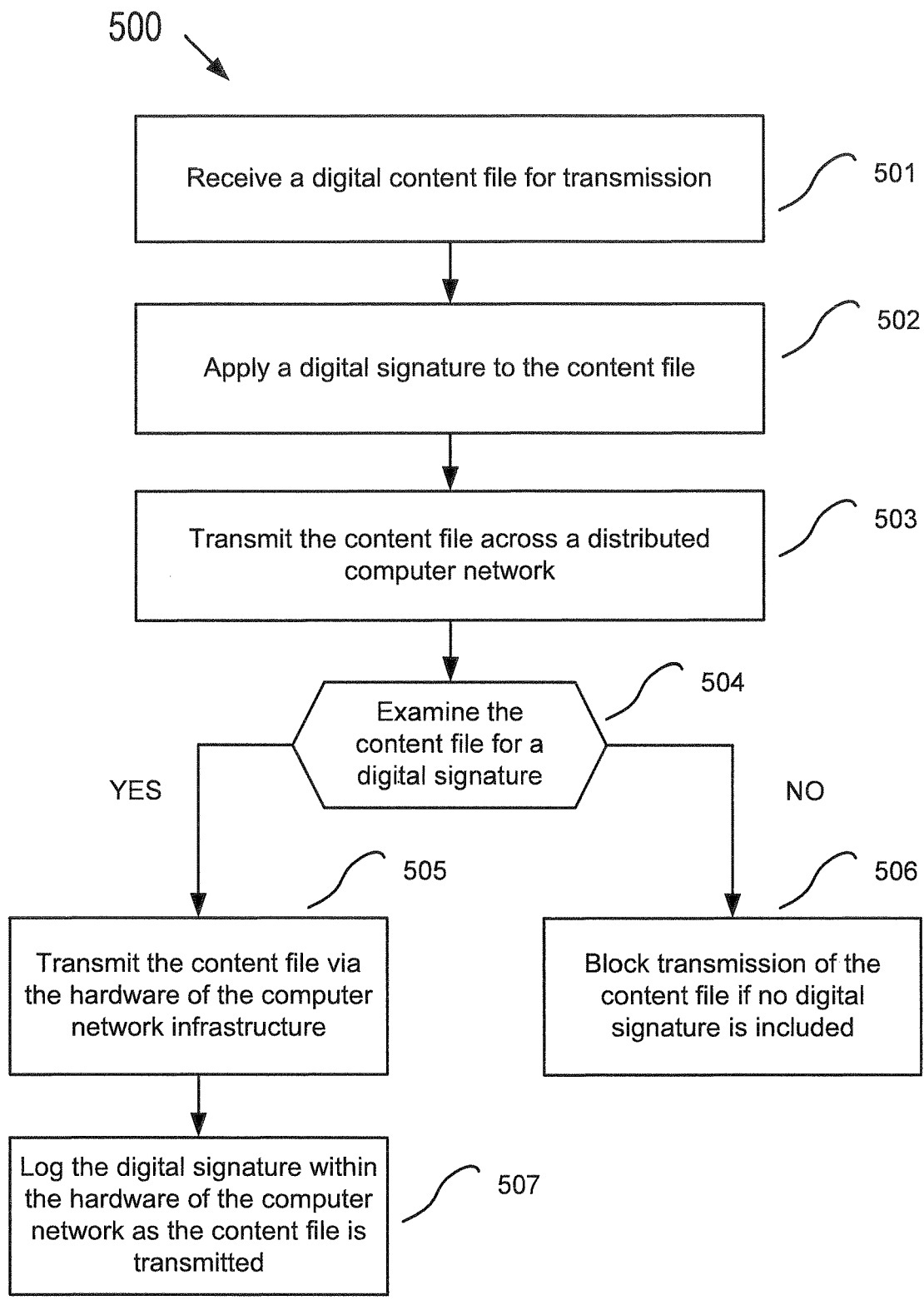
FIG. 5 shows a flowchart of the steps of a digital signature copy protection process in accordance with one embodiment of the present invention.

FIG. 5 shows a flowchart of the steps of a process 500 in accordance with a digital signature copy protection embodiment of the present invention. As depicted in FIG. 5, process 500 shows the operating steps as performed by computer network infrastructure hardware (e.g., router 110, etc.) as digital content files are examined for digital signatures as they are transmitted across the distributed computer network (e.g., computer network 101).

Process 500 begins in step 501, where a digital content file is received by a user (e.g., a user on client machine 130a) coupled to computer network 101. The digital content file was transmitted from a content server (e.g., content server 120)

with the appropriate digital signature, verifying its authenticity. As described above, the digital signature copy protection process of the present invention includes the step of applying a digital signature to a digital content file prior to transmission. Thus, in step 502, the digital content files that are to be legitimately transmitted across the distributed computer network are modified by the application of digital signatures corresponding to the sender. In step 503, the digital content file, including the digital signature of the user, is transmitted across distributed computer network 101.

Subsequently, in step 504, as content files are transmitted across a distributed computer network 101, the hardware comprising distributed computer network examines the content files to determine whether they include the digital signatures. As described above, the examining is performed by hardware comprising the infrastructure of the distributed computer network. In step 505, when content files include respective digital signatures, the content files are transmitted by the infrastructure. In step 506, when the content files do not include the digital signatures, transmission of those content files not having digital signatures is blocked. The digital signatures are configured to identify the senders of the digital content files. Thus, in step 507, the digital signatures are logged within the hardware of distributed computer network 101 to maintain a record of the digital content files and their corresponding signatures as they are transmitted. As described above, the hardware performing the examining and logging can be a plurality of routers or a plurality of cache engines within the distributed computer network.

Thus, the present invention provides a solution that enhances copy protection for copyrighted digital content. The present invention is robust enough to prevent easy circumvention while avoiding the imposition of latency inducing encryption on edge devices. The present invention provides accountability for the dissemination of copyrighted digital content. Additionally, the present invention preserves network resources for use by authorized traffic.

Computer System Environment

Figure 6:
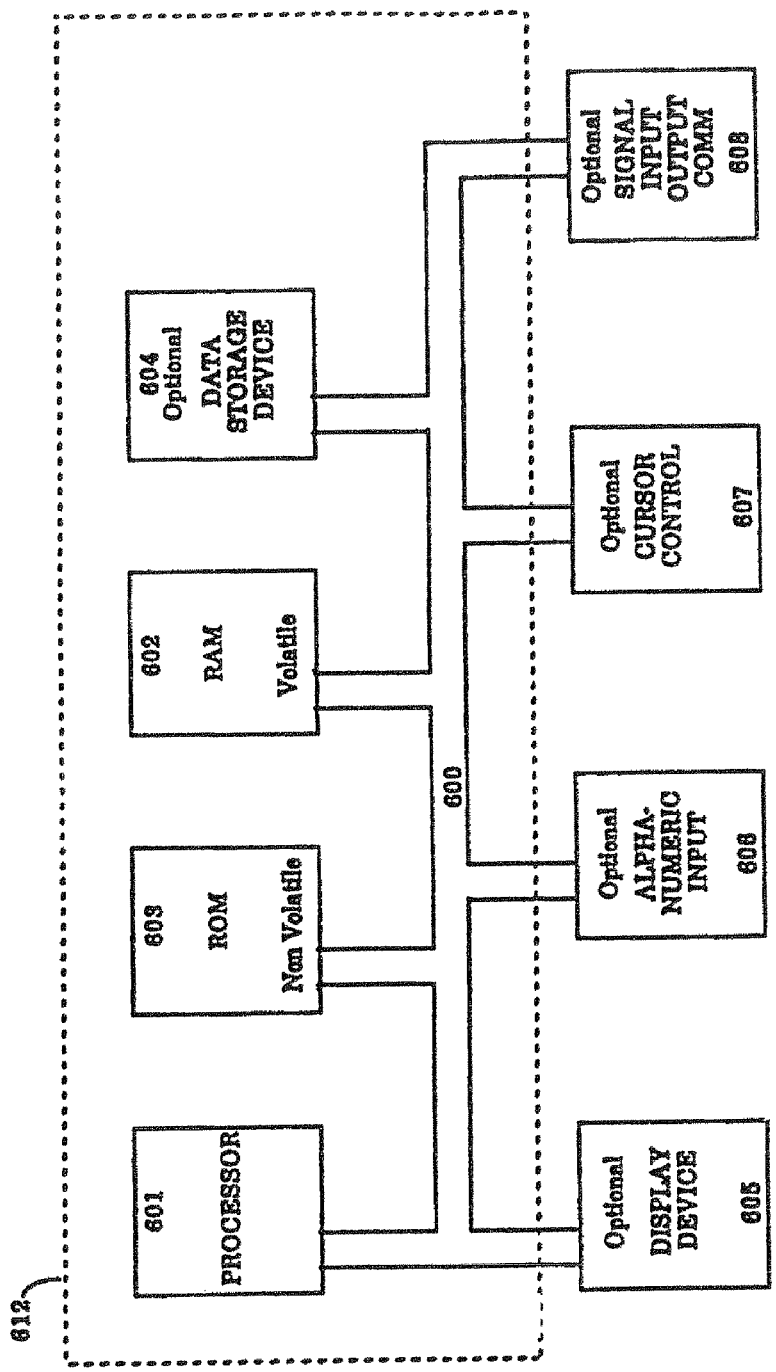
FIG. 6 shows a diagram of a computer system platform in accordance with one embodiment of the present invention.

Referring to FIG. 6, a computer system 612 is illustrated. Within the following discussions of the present invention, certain processes and steps are discussed that are realized, in one embodiment, as a series of instructions (e.g., software program) that reside within computer readable memory units of system 612 and executed by processors of system 612. When executed, the instructions cause computer system 612 to perform specific actions and exhibit specific behavior which was described in detail above.

Specific aspects of the present invention are operable within a programmed computer system which can function as either a client machine, a server machine, or implement the functionality of a router, load balancer, cache engine, or the like. A generalized example of such a computer system operable to implement the elements of the present invention is shown in FIG. 6. In general, the computer system of the present invention includes an address/data bus 600 for communicating information, one or more central processor(s) 601 coupled with bus 600 for processing information and instructions, a computer readable volatile memory unit 602 (e.g., random access memory, static RAM, dynamic RAM, etc.) coupled with bus 600 for storing information and instructions for the central processor(s) 601, a computer readable non-volatile memory unit 603 (e.g., read only memory, programmable ROM, flash memory, EPROM, EEPROM, etc.) coupled with bus 600 for storing static information and instructions for processor(s) 601. System 612 can optionally include a mass storage computer readable data storage device 604, such as a magnetic or optical disk and disk drive coupled with bus 600 for storing information and instructions. Optionally, system 612 can also include a display device 605 coupled to bus 600 for displaying information to the computer user, an alphanumeric input device 606 including alphanumeric and function keys coupled to bus 600 for communicating information and command selections to central processor(s) 601, a cursor control device 607 coupled to bus for communicating user input information and command selections to the central processor(s) 601, and a signal input/output device 608 coupled to the bus 600 for communicating messages, command selections, data, etc., to and from processor(s) 601.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method, comprising:

receiving a digital content file for transmission across a distributed computer network, wherein the distributed computer network comprises an intermediate node;

examining data comprising the content file to determine whether the content file includes a restricted data format, the examining performed by the intermediate node within the distributed computer network;

transmitting the content file to a computer system comprising one or more endpoints when data comprising the content file does not include the restricted data format, wherein the computer system is located external to the distributed computer network; and blocking transmission of the content file when data comprising the content file does include the restricted data format to prevent unauthorized downloading of copyrighted material, wherein the blocking is effected prior to a transmission of the content file to the computer system.

2. The method of claim 1 wherein the distributed computer network comprises the Internet.

3. The method of claim 1 wherein the examining is performed by one or more routers within the distributed computer network.

4. The method of claim 1 wherein the examining is performed by one or more cache engines within the distributed computer network.

5. The method of claim 1 further comprising:

examining data associated with the digital content file to identify one or more digital signatures associated with one or more senders of the digital content file;

maintaining a log of each transmission of the digital content file and the associated one or more digital signature; and identifying the one or more senders from the log after the transmission of the digital content file.

6. A method comprising:

receiving a digital content file for transmission across a distributed computer network;

examining the digital content file to determine whether the digital content file comprises one or more signatures, wherein the one or more signatures identify one or more senders that requested transmission of the digital content file across the distributed computer network; and logging the digital content file and the one or more signatures in a log, wherein the log of the one or more signatures is maintained in the distributed computer network to determine an identity of the one or more senders of the digital content file, and wherein the one or more senders reside external to the distributed computer network.

7. The method of claim 6 wherein the log is capable of maintaining a plurality of signatures associated with a single digital content file.

8. The method of claim 7 further comprising:

identifying the one or more senders associated with the plurality of signatures, wherein one or more of the plurality of signatures is logged each time the digital content file is transmitted across the distributed computer network.

9. A network device comprising:

a bus;

computer readable memory units connected to the bus;

one or more processors coupled to the bus for executing a digital signature method for a network infrastructure copy protection system, comprising:

examining a digital content file to determine whether the digital content file includes a digital signature, wherein the examining is performed within the distributed computer network;

logging the digital content file and the digital signature to create a file transmission log, wherein the file transmission log is maintained within the distributed computer network;

transmitting the digital content file when the digital content file includes the digital signature;

blocking transmission of the digital content file when the digital content file does not include the digital signature to prevent unauthorized downloading of copyrighted material, wherein the blocking is effected prior to a transmission of the digital content file to a receiver; and identifying a sender of the digital content file according to the digital signature included in the file transmission log after the digital content file has been transmitted, wherein both the sender and the receiver of the digital content file are located external to the distributed computer network.

10. The device of claim 9 wherein the file transmission log is configured to maintain a plurality of digital signatures associated with a single digital content file, where each of the plurality of digital signatures is logged for a separate transmission of the digital content file.

11. The device of claim 9 wherein the digital signature applied to the content file within the distributed computer network is logged to maintain a record for the content file and the digital signature when the content file is transmitted across the distributed computer network.

12. The device of claim 9 wherein the distributed computer network comprises the Internet.

13. The device of claim 9 wherein the examining is performed by one or more routers within the distributed computer network.

14. The device of claim 9 wherein the examining is performed by one or more cache engines within the distributed computer network.

15. A method comprising:

receiving a digital content file for transmission across a distributed computer network;

examining the digital content file for inclusion of a first digital signature, wherein the digital content file is examined within the distributed computer network;

logging the digital content file and the first digital signature, wherein the log is maintained within the distributed computer network;

verifying an authenticity of the first digital signature, wherein the first digital signature is associated with a first user located external to the distributed computer network;

transmitting the digital content file including the first digital signature;

receiving the digital content file;

examining the digital content file for inclusion of a second digital signature;

logging the digital content file and the second digital signature;

verifying an authenticity of the second digital signature, wherein the second digital signature is associated with a second user located external to the distributed computer network; and transmitting the digital content file including the second digital signature.

16. The method of claim 15 wherein a log is maintained of the digital content file and both of the corresponding first and second digital signatures.

17. The method of claim 16 further comprising:

identifying the first and second users from the first and second digital signatures maintained in the log.

18. A system comprising:

means for receiving a file for transmission across a distributed computer network;

means for examining the file to determine whether the file includes one or more signatures, the examining performed within the distributed computer network;

means for transmitting the file across the distributed computer network when the content file includes the one or more signatures;

means for blocking transmission of the file when the file does not include the one or more signatures, wherein the blocking is effected prior to a transmission of the file to a receiver, and wherein the receiver is located external to the distributed computer network; and means for maintaining a log of the file and the one or more corresponding signatures, wherein the log is maintained within the distributed computer network to identify one or more senders of the file after the file has been transmitted across the distributed computer network, and wherein the one or more senders are located external to the distributed computer network.

19. The system of claim 18 wherein the log is configured to maintain a plurality of digital signatures for a single file that is transmitted multiple times across the distributed network.

20. A system comprising:

means for receiving a digital content file for transmission across a distributed computer network;

means for using at least one router located within the distributed computer network, wherein the at least one router is configured to log one or more digital signatures related to the digital content file to maintain a record for the digital content file and the related digital signatures, the record including the related digital signatures;

means for examining data comprising the digital content file to identify the one or more digital signatures;

means for transmitting the digital content file outside of the distributed computer network when the data comprising the digital content file includes the one or more digital signatures; and means for blocking the transmission of the digital content file when the data comprising the digital content file does not include the one or more digital signatures; and means for analyzing the record to identify one or more senders associated with the one or more digital signatures, wherein the record is configured to maintain a plurality of digital signatures for a digital content file that is transmitted by the one or more of senders, and wherein the one or more senders are located external to the distributed computer network.

21. The system of claim 20 further comprising:
means for identifying the one or more senders that transmitted the digital content file across the distributed network, wherein each of the one or more senders is associated with at least one of the digital signatures.

22. The system of claim 20 wherein the record logging the digital content file and the related digital signatures is maintained within the distributed computer network.

* * * * *